United States Patent
Wheeler

(10) Patent No.: US 7,064,850 B1
(45) Date of Patent: Jun. 20, 2006

(54) PAPER PREVIEWER FROM PRELOADED INFORMATION

(75) Inventor: Philip Orrin Wheeler, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 709 days.

(21) Appl. No.: 09/645,805

(22) Filed: Aug. 24, 2000

(51) Int. Cl.
*G06F 15/00* (2006.01)
*G06K 15/02* (2006.01)

(52) U.S. Cl. ..................... 358/1.15; 358/527
(58) Field of Classification Search ............... 358/1.14, 358/1.15, 1.6, 1.2, 501, 504, 505, 402, 403, 358/405, 449; 399/16, 23, 87; 355/407, 355/403, 47, 75
See application file for complete search history.

(56) References Cited

U.S. PATENT DOCUMENTS

| | | | |
|---|---|---|---|
| 5,133,048 A * | 7/1992 | Parsons et al. ............ 358/1.12 |
| 5,305,020 A * | 4/1994 | Gibbons et al. ............ 347/177 |
| 5,580,177 A | 12/1996 | Gase et al. | |
| 5,680,629 A | 10/1997 | Slayden et al. | |
| 5,784,177 A * | 7/1998 | Sanchez et al. ............ 358/468 |
| 5,963,216 A | 10/1999 | Chiarabini et al. | |
| 6,295,136 B1 | 9/2001 | Ono .......................... 358/1.15 |
| 6,628,418 B1 * | 9/2003 | Katahira ................... 358/1.16 |

FOREIGN PATENT DOCUMENTS

JP  07030704  1/1995

OTHER PUBLICATIONS

English language abstract of Japanese Patent No. 1995-07030704.

* cited by examiner

*Primary Examiner*—Douglas Q. Tran
(74) *Attorney, Agent, or Firm*—Michael Blaine Brooks, P.C.; Rosemarie F. Jones; David Ripma

(57) ABSTRACT

A method of configuring paper stock in a printing device. The method includes loading paper into a tray of the printing device and then providing information about the paper and the tray to the printing device. Once the information is provided to the printing device, a user interface is updated to include that information. Also included is a method presenting a user interface that includes establishing a window on a display device viewable by a user and providing the user with a view of paper in at least one paper tray of the printing device. The method also includes the step of allowing the user to select the at least one paper tray to complete a print job.

26 Claims, 5 Drawing Sheets

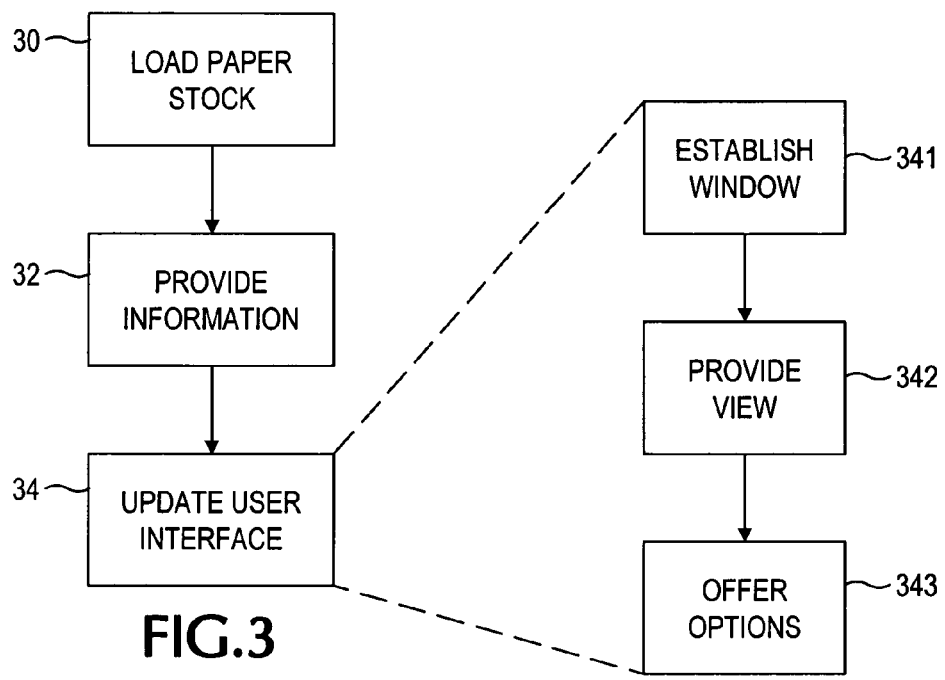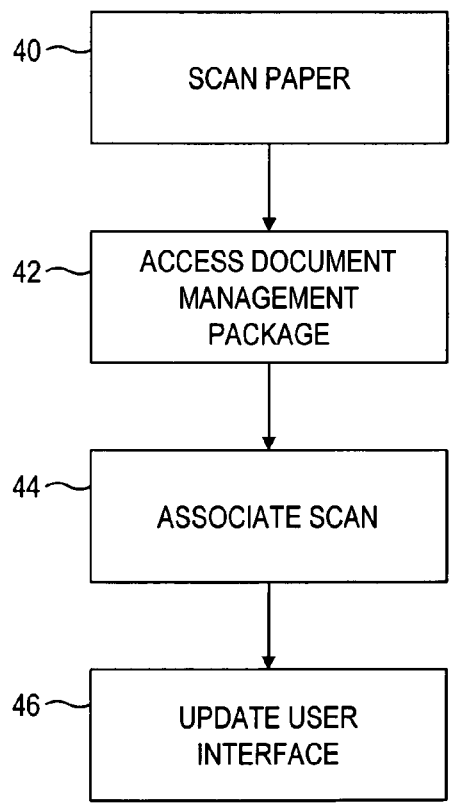

PAPER PREVIEWER FROM PRELOADED INFORMATION

BACKGROUND

1. Field

The field of this disclosure relates to printing devices, more particularly to a method and interface that provides a preview of the paper in the device prior to use.

2. Background

Printing devices, including printers, copiers and multifunction peripherals (MFPs) typically have at least one paper tray from which the device retrieves paper for printing. Many large networked printing devices have several paper trays. This can cause inconvenience to users, especially if the user desires to use a specialty paper.

This inconvenience typically results from the user loading specialty paper in one of the paper trays in the device, returning to his or her desk and then not being able to remember or locate the tray in which the specialty paper was loaded. The specialty paper could be letterhead, colored paper or other types.

Current printers and copiers may have small guides that allow the printing device to receive information as to the size and orientation of the paper. However, this does not assist in the situation where the paper is of a standard size but has some other special characteristic. Typically, the user interface presented to the user to print documents includes a specification of the paper size.

Other information is available through user interfaces. Most users are familiar with the 'print preview' or similar options in several document creation packages, such as Microsoft® Word®, Excel®, Access®, WordPerfect®, etc. An example of such a feature is shown in U.S. Pat. No. 5,680,629, issued Oct. 21, 1997.

Other methods of previewing print jobs are also possible. For example, one method of showing the user a representation of the printed output is described in U.S. Pat. No. 5,963,216, issued Oct. 5, 1999. In this example, the calls to the printer driver are converted to calls to a display driver and the results are shown on a display device viewable by the user. Typically, control of the printing device is done through a user interface with the printer driver, familiar to most users of personal computers. A more detailed discussion of printer drivers and updating and maintaining them is shown in U.S. Pat. No. 5,580,177, issued Dec. 3, 1996.

Interaction with the printer drivers typically starts with a user interface opening and establishing a window through which the computer user interacts with the driver to provide the output the user desires. Selections such as paper tray, including those with different sized papers, orientation of the printed output on the paper, number of copies, collation options, etc., are provided to the user. However, there is no means to offer the user information about the content of the paper stock. The content refers to the visual characteristics of the paper, such as color, pre-printed information like a letterhead, etc., rather than physical characteristics such as size and orientation.

Therefore, a need exists for a method to provide information about the visual characteristics of the paper in a printing device.

SUMMARY

One embodiment of the invention is a method for providing information as to the visual characteristics of the paper in a printing device. The method includes the steps of loading the paper in the tray, providing information to the printing device system as to the visual contents of the paper and updating a user interface. The information provided may be the paper color, an identification of a template or form from a menu, or selection of preloaded images, such as letterhead. The information may be provided by the loaded by selecting the characteristic from a menu or could be the result of a scan of the paper that is then manually associated with the tray.

Another embodiment of the invention is a method for providing a user interface. The method includes the steps of establishing a window, providing a view of the paper in a particular tray on a printing device and offering the user options to select that tray to use the viewed paper.

BRIEF DESCRIPTION OF THE DRAWINGS

The invention may be best understood by reading the detailed description with reference to the drawing(s), wherein:

FIGS. 3 and 3a show a flowchart for one embodiment of a method of providing information about visual characteristics of the paper in a printing device, in accordance with the invention.

FIG. 4 shows a flowchart for a first alternative embodiment of a method of providing information about visual characteristics of the paper in a printing device, in accordance with the invention.

DETAILED DESCRIPTION OF THE EMBODIMENTS

Figure 1:
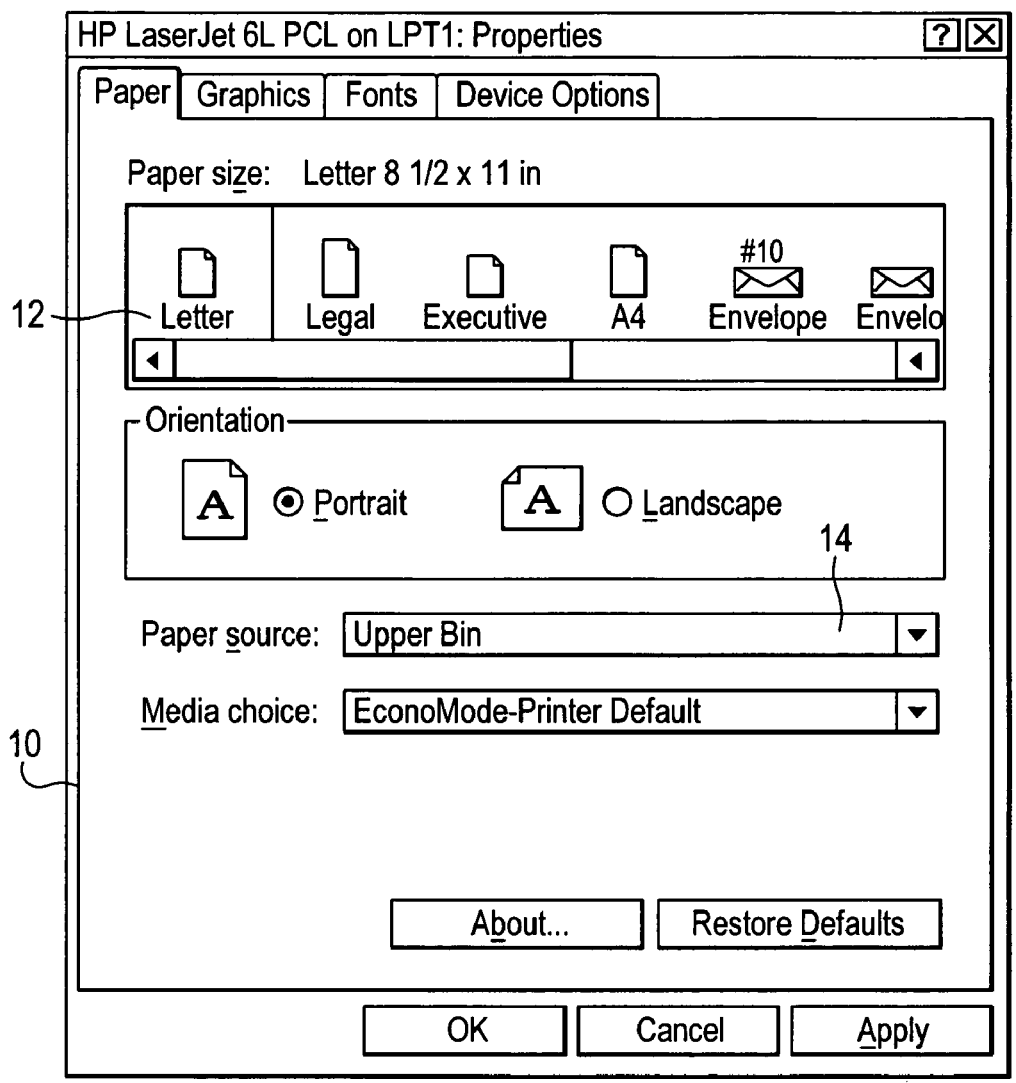
FIG. 1 shows a prior art user interface for a printer driver.

FIG. 1 shows an example of a prior art printer driver interface. This particular interface was selected by selecting Print from the File menu in MS-Word®, and then selecting the Properties button on the resulting window 10. As can be seen, the paper size is shown in the inner window 12. In this example, there was only one printer attached and that printer did not have multiple trays. In a networking environment, there will be more than one printer, and several of these networked printers have several trays.

As mentioned previously, a problem can occur when a user loads a specialty paper into one of the trays on a networked or remotely connected printer and then cannot remember the tray in which that paper was loaded. As can be seen by the inner window 14, it is possible for the user to select the tray, but that is not helpful unless the user can 'see' the paper in the bin. There may be several trays carrying letter-sized (8½ inch by 11 inch) paper, for example, and the user may not remember or know what tray the colored paper is in.

Figure 2:
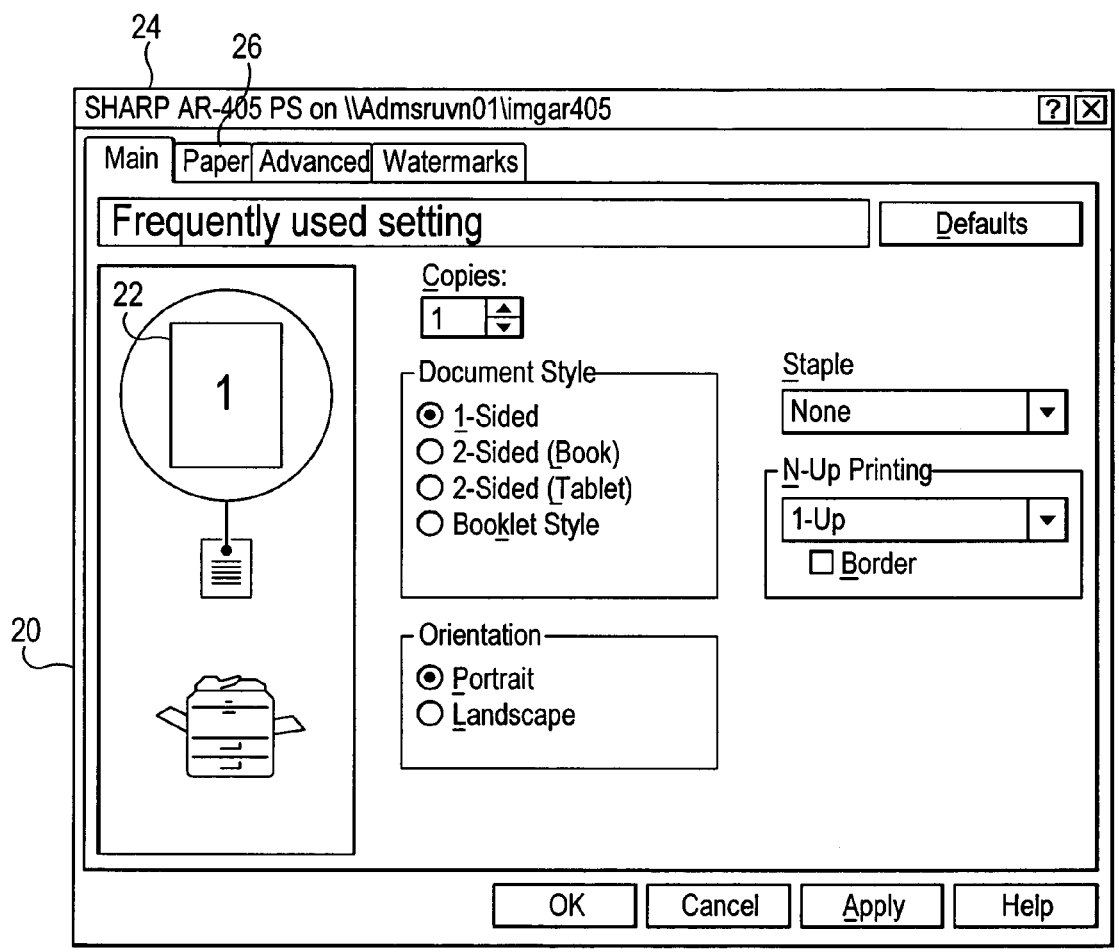
FIG. 2 shows a user interface for a printer driver, in accordance with the invention.

One embodiment of a user interface in accordance with the invention is shown in FIG. 2. The window 20 is for a specific printer, shown by the information line 24. However, this interface may afford the user a unique view of the paper stock in a particular tray. The area 22 would have the color of the specialty paper, for example, canary yellow. The color may be automatically loaded because of the selection of the paper tray selected in the paper tab 26, similar to that shown in FIG. 1.

This user interface is an example of one that takes information related to the visual contents of the paper and provides it to the user. Again, as used here the visual contents or characteristics refer to characteristics of the surface of the paper, such as letterhead symbols, color, etc. These are different from the physical characteristics of the paper such as its size or orientation.

There are several options as to how the information about the visual characteristics is provided to the system and/or the user. One such method is shown in flowchart form in FIG. 3. In this method, the information to be provided to a user accessing the printing device is entered in a somewhat manual manner. A particular type of paper is loaded into the tray at 30. The person loading the paper then provides the information at 32.

This could be done in one of several ways. After the paper is loaded, for example, the person loading the paper could access the control interface on the control panel of the printing device. A set of menus would be provided with a list of specialty papers. This list could be a list of colors, letterhead formats, templates for standardized forms, etc. The loader then selects the type of paper loaded. The printing device then updates the user interface presented to users at 34 trying to print from that device, to show the particular visual characteristics for the paper. In addition, the loader may need to designate into which tray the paper was placed.

In an alternative example, the loader could select a piece of paper from the newly loaded tray and scan it with a resident scanner on a copier or multi-function peripheral. The user interface would offer a 'paper' option on the menu. The loader would select that option, place the paper down on the scanning platen and the system would scan the paper. The loader would then be offered the option of designating the tray into which that paper has been loaded. This would then provide the information about the paper at 32, and the process would continue at 34.

As will be discussed in more detail later, it is possible that the printing device may sense the replacement of the tray and could start the process of associating a certain paper characteristic with a certain tray. For example, the printing device may assume that the tray replaced by the loader has new paper in it and may launch the control interface. This leaves the loader only the task of designating the characteristics of the paper in that tray.

One embodiment of a method of providing user interface updated in the process of FIG. 3, as well as any alternative methods, is shown in FIG. 3*a*. When the user accesses the printer options or set up menu, similar to that shown in FIGS. 1 and 2, a window is established. The window allows the user to interact with the printer driver in a convenient manner. Once the window is established, the user is presented with a view of the paper in the currently selected paper tray. The view could be a color block to demonstrate the color of the paper, a thumbnail sketch of the paper, or a template. Templates would typically used for such things as forms.

The method of providing a user interface, shown by example in FIG. 3*a* may apply to any methods of providing information about the visual characteristics of paper in a printing device. A first alternative method of acquiring the necessary information prior to providing it to the user is shown in FIG. 4.

In this embodiment, it is assumed that the user has access to a scanning device. The scanning device may be in the same housing as the printing device, such as in a copier or multi-function peripheral. The scanning device may also be a stand-alone scanner, or a scanner attached to a workstation on the network.

The user scans a piece of the paper to be loaded at 40. This will create an image of the paper in some form that can be transported from the scanner. The user would then access a document management software package at 42. The document management software would then allow the user to associate the scan data, or scan, with a particular tray of the printing device at 44. The printing device user interface would then be updated to include the scanned image at 46. The user can then load the paper into the device, or if it is already loaded, access the user interface of the printing device. The user interface would now include an image of the paper in that particular tray, where the image presented is that transported through the document management package.

Figure 5:
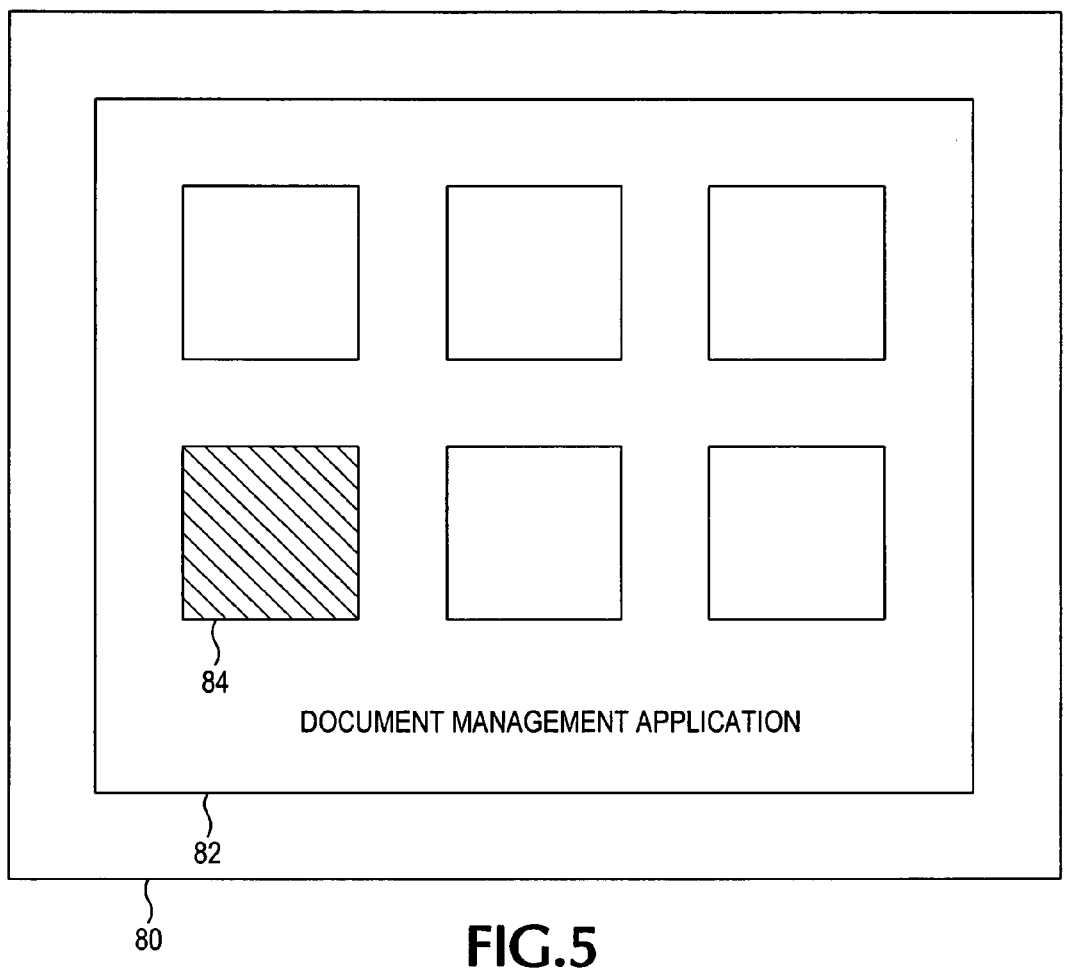
FIG. 5 shows one embodiment of a user interface into which an image of the paper to be used in a printing device can be scanned, in accordance with the invention.
Figure 6:
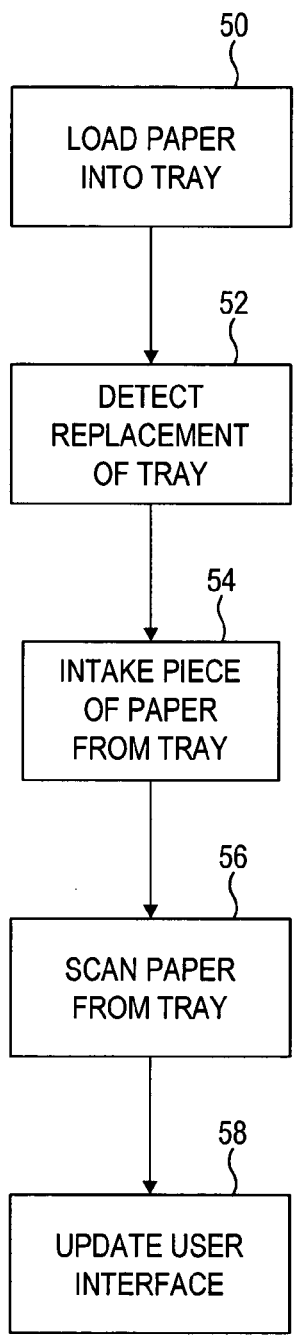
FIG. 6 shows a flowchart for a second alternative embodiment of a method of providing information about visual characteristics of the paper in a printing device, in accordance with the invention.

An example of a user interface for a document management packages is shown in FIG. 5. Examples of these packages include SharpDesk™ and Adobe Acrobat®. Any document management application that can manage scanned images can be used. A window 82 is established on a display device 80. The document management application window may have several types of documents. The image of the scanned paper created by a process such as that discussed above would be treated as a document by this application. For example, the image of the scanned paper 84 would be listed among the other documents by the package. This image could then be associated with a tray on a printer after the paper was loaded into the printer.

All of the above embodiments would more than likely be distributed as software contained upon some type of computer readable medium, such as a printer driver. In some cases the computer would be a host computer or network server that would access the software and load it into the printer. In other instances, the computer would be the processor in the printing device. It could download the file across the network.

In some instances, the printing device may have a scanning device in the same system housing. This would be true for printing devices that are part of copying systems and multi-function peripheral systems, as examples. In this example, the scanning device is used to produce the image, and the user interface on the system would include the ability to associate a scan with a particular tray.

The user would remove the tray and load it with the new paper at 50. When the tray is replaced, the system would sense the replacement at 52 and automatically start a paper scanning process. If the paper loaded is the same as the paper already in the tray, the system may offer an override option to prevent the paper scanning process. Alternatively, the system may inquire of the user about starting the paper scanning process.

Once the system has launched the paper scanning process, it will take a piece of paper from the replaced tray at 54. It will then alter the paper path, which will be discussed in more detail with reference to FIG. 7, to route the paper past the scanning device. The scanning device will then scan the paper at 56. The resulting information will be used to update the user interface at 58. Once the paper scanning process is completed, the system will adjust operation for the paper from the tray to travel its normal printing path, rather than the scanning path.

Figure 7:
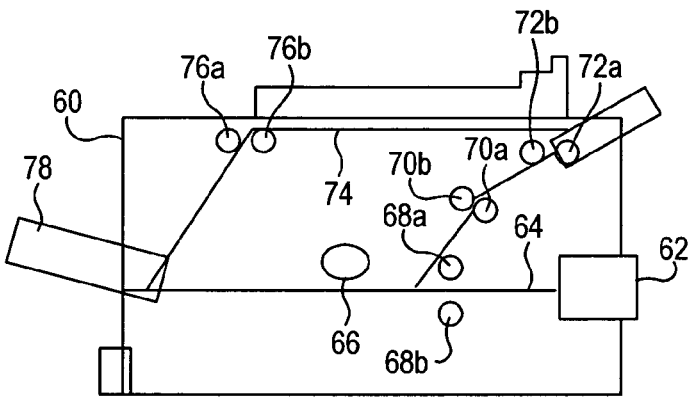
FIG. 7 shows an embodiment of a printing device with a scanning path for recording information about the paper used in the printing device, in accordance with the invention.

An example of such a system with alterable paper paths 60 in accordance with the invention is shown in FIG. 7. The paper tray 62 is loaded and replaced. The system then senses the replacement and launches the paper scanning process. Prior to altering the paper path as part of the scanning process, the paper would normally be picked up from the tray and sent along path 64 past whatever mechanism is used to transfer the image to the paper. In this example, an electrophotographic printing process, the paper passes by an optical photoreceptor (OPC) upon which lies a toner image. This is then transferred to the paper and fused to the paper by fusing rollers, not shown. The resulting printed paper is then sent to the output tray 78.

However, upon launching the paper scanning process, the paper path will be changed to pass the paper by the scanning device. This can be done in several ways. One example of such an altered path is shown in FIG. 7. Additional pickup rollers 68a and 68b are mounted on moveable axles that allow them to be moved into place when the paper enters the paper path 64. These will then alter the path of the paper to travel upwards to a second set of rollers 70a and 70b. The paper will then be redirected to pass in front of the platen 74 by redirection rollers 72a and 72b. After the paper is scanned, it is passed to the output tray by rollers 76a and 76b. All of these rollers could be adjustable, so they can be moved out of the way of the paper when not needed. Alternatively, none of them would move, or some of them would move while others would not.

This is just one example of a printing system in which the paper from the output tray could be sent along an alternative path. The alternative path would allow the scanning device in the system to scan the paper. It should be configured so as not to affect system performance during operations other than paper scanning. Additionally, the example is for an electrophotographic system, but could apply to any type of print engine.

Thus, although there has been described to this point a particular embodiment for a method and structure for a user interface that offers a preview of the paper in a printing device it is not intended that such specific references be considered as limitations upon the scope of this invention except in-so-far as set forth in the following claims.

What is claimed is:

1. A method of configuring paper stock in a printing device, wherein the printing device is adapted to receive at least one tray, wherein the at least one tray is adapted to receive at least one paper having a surface, and wherein the printing device is adapted to retrieve the paper from the tray for printing, the method comprising the steps of:
   providing a visual image of preprinted characteristics of the surface of the at least one paper and information about the at least one tray adapted to receive the at least one paper; and
   providing a user interface comprising the visual image of preprinted characteristics information and information about the tray.

2. The method of claim 1 wherein the printing device is a printer.

3. The method of claim 1 wherein the printing device is a copier.

4. The method of claim 1 wherein the printing device is a multi-function peripheral.

5. The method of claim 1 wherein the providing the visual image step further comprises a control input signal from a control interface on a control panel of the printing device.

6. The method of claim 1 wherein the providing the visual image step further comprises scanning the at least one paper and associating a resulting scanned image with the at least one tray.

7. The method of claim 1 wherein the providing the visual image step further comprises accessing a control interface on a computer connected to the printing device.

8. The method of claim 1 wherein the user interface is remote to the printing device.

9. The method of claim 1 wherein the printing device is a scanner.

10. The method of claim 1 wherein the preprinted characteristics information comprises template information.

11. The method of claim 10 wherein the template information comprises letterhead information.

12. The method of claim 10 wherein the template information comprises form information.

13. A method of providing a user interface operable to interact with a printing device, wherein the printing device is adapted to receive at least one paper tray and wherein the at least one tray is adapted to receive at least one paper having a surface, the method comprising the steps of:
    establishing a window on a display device viewable by a user ;and
    providing the user with a view of the surface of the at least one paper adapted to be received in the at least one paper tray, wherein the view comprises a visual image of the surface of the at least one paper.

14. The method of claim 13 wherein the view further comprises a template image.

15. The method of claim 13 wherein the view further comprises a visual color image of the paper.

16. The method of claim 13 wherein the view further comprises a thumbnail image.

17. The method of claim 13 wherein the visual image is a scanned image.

18. The method of claim 13 wherein the display device is remote from the printing device.

19. The method of claim 14 wherein the template comprises letterhead information.

20. The method of claim 14 wherein the template comprises form information.

21. A computer readable medium containing software code, said code operable to:
    receive information about the visual image characteristics of a surface of a paper , wherein the paper is adapted to be received by and associated with a tray in which the paper may be received; and
    update a user interface to include the visual image characteristics information.

22. The medium of claim 21 wherein the medium further comprises a downloadable file.

23. The medium of claim 21 wherein the medium further comprises a printer driver.

24. The medium of claim 21 wherein the visual image characteristics comprises scanned image characteristics.

25. The medium of claim 21 wherein the user interface is a remote user interface.

26. A printing device comprising:
    at least one tray adapted to receive at least one paper having a surface, wherein the printing device is adapted to retrieve the at least one paper for printing; and
    a processor adapted to interact with a set of instructions, wherein the set of instructions is operable to:
       receive visual image characteristics information of the surface of the at least one paper, wherein the at least one paper is associated with the at least one tray; and
       update a user interface to include the received information.

* * * * *